US011308562B1

(12) United States Patent
Ran et al.

(10) Patent No.: US 11,308,562 B1
(45) Date of Patent: Apr. 19, 2022

(54) SYSTEM AND METHOD FOR DIMENSIONALITY REDUCTION OF VENDOR CO-OCCURRENCE OBSERVATIONS FOR IMPROVED TRANSACTION CATEGORIZATION

(71) Applicant: Intuit Inc., Mountain View, CA (US)

(72) Inventors: Alexander S. Ran, Palo Alto, CA (US); Christopher Lesner, Palo Alto, CA (US); Wei Wang, San Jose, CA (US); Marko Rukonic, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 67 days.

(21) Appl. No.: 16/057,509

(22) Filed: Aug. 7, 2018

(51) Int. Cl.
*G06Q 40/00* (2012.01)
*G06F 16/22* (2019.01)

(52) U.S. Cl.
CPC ......... *G06Q 40/12* (2013.12); *G06F 16/2291* (2019.01)

(58) Field of Classification Search
CPC ............. G06Q 20/227; G06Q 30/0631; G06Q 30/0269; G06Q 20/202; G06Q 20/401
See application file for complete search history.

(56) References Cited

U.S. PATENT DOCUMENTS

| | | | | |
|---|---|---|---|---|
| 8,538,967 | B1 * | 9/2013 | Wu | G06Q 40/02 707/737 |
| 10,019,755 | B1 * | 7/2018 | Hanscom | G06Q 40/00 |
| 10,025,817 | B2 * | 7/2018 | Mavinakuli | G06Q 10/0639 |
| 10,354,336 | B1 * | 7/2019 | Izrailevsky | G06Q 40/12 |
| 10,581,805 | B2 * | 3/2020 | Simons | H04L 9/0637 |
| 2007/0299743 | A1 * | 12/2007 | Staib | G06Q 30/0204 705/7.33 |
| 2009/0222364 | A1 * | 9/2009 | McGlynn | G06Q 30/02 705/30 |
| 2009/0222365 | A1 * | 9/2009 | McGlynn | G06Q 30/02 705/30 |
| 2009/0234683 | A1 * | 9/2009 | Anderson | G06Q 20/10 705/38 |
| 2013/0325681 | A1 * | 12/2013 | Somashekar | G06Q 40/00 705/35 |
| 2014/0201126 | A1 * | 7/2014 | Zadeh | A61B 5/4803 706/52 |
| 2016/0063502 | A1 * | 3/2016 | Adjaoute | G06Q 20/4016 705/44 |
| 2017/0236131 | A1 * | 8/2017 | Nathenson | G06Q 30/0201 705/26.7 |
| 2018/0300315 | A1 * | 10/2018 | Leal | G06F 16/355 |
| 2019/0130015 | A1 * | 5/2019 | Zhang | G06N 7/005 |
| 2019/0138509 | A1 * | 5/2019 | von Rickenbach | G06F 16/285 |

(Continued)

OTHER PUBLICATIONS

McCormick, Chris (Jan. 11, 2017). Word2Vec Tutorial Part2—Negative Sampling ("McCormick").*

*Primary Examiner* — Peter Ludwig
(74) *Attorney, Agent, or Firm* — Paradice and Li LLP

(57) ABSTRACT

A method and system assists users of an electronic bookkeeping system to sort financial transactions into accounts representing bookkeeping categories. The method and system generates vectors representing the accounts and the merchants known to the bookkeeping system. The method and system generates compressed versions of the vectors by compressing the vectors. The method and system assists users to sort the financial transactions by analyzing the compressed vectors.

12 Claims, 4 Drawing Sheets

(56) References Cited

U.S. PATENT DOCUMENTS

2019/0164164 A1* 5/2019 Karambakkam .... G06K 9/6263
2019/0188579 A1* 6/2019 Manoharan ............ G06N 5/025
2019/0205993 A1* 7/2019 Rodriguez .......... G06F 16/2237
2019/0378050 A1* 12/2019 Edkin .................... G06N 20/00

* cited by examiner

SYSTEM AND METHOD FOR DIMENSIONALITY REDUCTION OF VENDOR CO-OCCURRENCE OBSERVATIONS FOR IMPROVED TRANSACTION CATEGORIZATION

BACKGROUND

Many individuals, businesses, and organizations around the world use electronic data management systems, such as electronic accounting systems, to help manage their finances. Electronic bookkeeping systems use accounts for categorization of business transactions. Such electronic bookkeeping systems gather data related to financial transactions of their users. The users can then sort the financial transactions into the various accounts in order to track their expenditures and revenues by category. The users can monitor many or all of their financial transactions and other financial matters from a single electronic bookkeeping system and sort them into the various financial accounts. Such an electronic bookkeeping system can help users to save time by eliminating the need to check with several different financial institutions in order to manage their finances. However, traditional electronic bookkeeping systems are unable to optimize the electronic bookkeeping services provided to their users because the traditional electronic bookkeeping systems are not able to adequately assist users in sorting their financial transactions into their various accounts.

For instance, some traditional electronic bookkeeping systems enable users to generate and name the various accounts into which the users will sort their financial transactions. Traditional electronic bookkeeping systems may attempt to recommend that the user sort the financial transaction into a particular account based on the name of the account. However, the names of the accounts chosen by users are often not adequate, by themselves, to enable a traditional electronic bookkeeping system to discern the true nature of the accounts. Accordingly, traditional electronic bookkeeping systems may suggest unrelated accounts or may not be able to make any suggestion at all. In the case that the traditional electronic bookkeeping system does not recommend any account to the user, the user is often forced to scroll through an entire chart of accounts each time the user seeks to sort a financial transaction into an account. This can be tedious and time consuming. In the case that the traditional electronic bookkeeping system makes a faulty account recommendation, this can distract the user and force the user into extra work in attempting to find the right account into which to sort the financial transaction. These inconveniences are magnified when the user uses a mobile device to sort financial transactions.

The inability of traditional financial systems to adequately understand the nature of user-created accounts results in under-utilization of the potential of electronic bookkeeping systems. For example, traditional electronic bookkeeping systems cannot adequately automate the process of sorting electronic financial transactions of the users. This results in wasted time and resources for both the users and the electronic bookkeeping systems. Furthermore, users may decide not to use the electronic bookkeeping system due to the inconvenience of the manual sorting process, or, worse yet, users may abandon the traditional electronic bookkeeping system because the traditional electronic bookkeeping system often erroneously sorts financial transactions into user accounts. The unrealized potential extends beyond merely assisting with the sorting process. An electronic bookkeeping system that understands the nature of the users' financial accounting and business practices can offer better electronic bookkeeping services to the users and to third-parties.

What is needed is a method and system that provide a technical solution to the long standing technical problem of accurately and efficiently assisting users of electronic bookkeeping systems to sort their financial transactions into the proper accounts.

SUMMARY

Embodiments of the present disclosure provide one or more technical solutions to the technical problem of accurately and efficiently assisting users of electronic bookkeeping systems to sort their financial transactions into the proper accounts. Embodiments of the present disclosure generate, for each merchant known to the data management system, a respective merchant characteristics vector identifying how often financial transactions involving that merchant are sorted into a same account as each of the other merchants known to the system. Embodiments of the present disclosure also generate, for each account of each of the users, a respective account characteristics vector indicating how financial transactions involving the various merchants have been sorted into the account. Embodiments of the present disclosure then reduce the number of data fields or dimensions represented by the account characteristics vectors and merchant characteristics vectors by performing one or more vector dimensionality reduction techniques. Embodiments of the present disclosure utilize the compressed account and merchant vectors to accurately and efficiently assist users to sort future financial transactions into the accounts of the users.

In one embodiment, when a data management system receives financial transaction data corresponding to a new financial transaction of a user, the data management system identifies the merchant involved in the financial transaction and retrieves the compressed merchant vector that represents the merchant. The data management system also retrieves the compressed account vectors associated with each of the accounts of that user. The data management system embeds the compressed merchant vector and the compressed account vectors into a vector space having a reduced dimensionality corresponding to the dimensionality of the compressed merchant and account vectors. The data management system determines how close each compressed account vector is to the compressed merchant vector in the compressed vector space. The data management system identifies one or more candidate accounts into which the financial transaction should be sorted based on how close the corresponding compressed account vectors are to the compressed merchant vector. The proximity of a compressed account vector to the compressed merchant vector is an indication of the probability that the financial transaction should be sorted into that account. Accordingly, the data management system can identify one or more accounts that are most likely to be the correct account into which the financial transaction should be sorted based on the compressed merchant and account vectors. The data management system can then assist the user to sort the financial transaction into one of the accounts.

In one embodiment, the account characteristics vectors and merchant characteristics vectors can be extremely large due to the very large number of merchants known to the data management system. Determining which account characteristics vectors are closest to a merchant characteristics vector can consume large amounts of resources due to the very large number of dimensions associated with the account characteristics vectors and the merchant characteristics vectors. However, embodiments of the present disclosure advantageously reduce the dimensionality of the vectors before determining which accounts likely fit a financial transaction. This vastly reduces the computing resources utilized to match a financial transaction with an account based on vector similarity. The dimensionality reduction has the added benefit of reducing noise in the vectors while maintaining the relative proximities of the vectors with respect to each other. The result is that account matching based on the compressed vectors is also more accurate due to the reduction in noise from the large uncompressed vectors.

Embodiments of the present disclosure address some of the shortcomings associated with traditional data management systems. Candidate accounts are identified in an efficient and accurate manner. Therefore, the various described embodiments of the disclosure and their associated benefits amount to significantly more than an abstract idea. In particular, by generating merchant characteristics vectors and account characteristics vectors, and then compressing the merchant characteristics vectors and the account characteristics vectors prior to identifying candidate accounts, the accuracy and efficiency of matching financial transactions to accounts is significantly improved.

Figure 1:
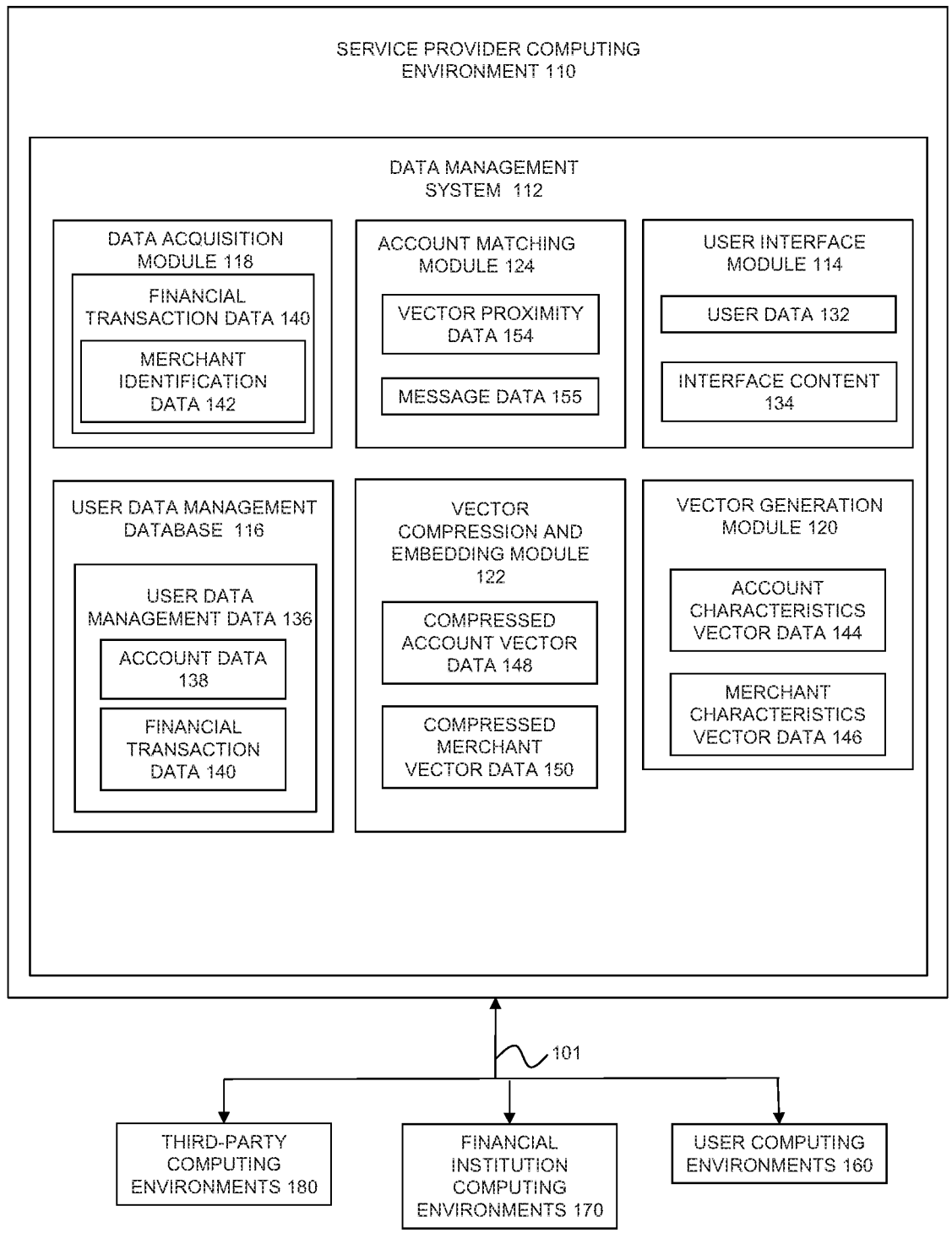
FIG. 1 is a block diagram of a system for accurately and efficiently assisting users of a data management system to sort financial transactions into accounts, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments.

Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

FIG. 1 illustrates a block diagram of a production environment 100 for accurately and efficiently assisting users of a data management system to sort financial transactions into accounts, according to one embodiment. Embodiments of the present disclosure generate merchant characteristics vectors and account characteristics vectors representing the characteristics of the merchants known to the data management system and the characteristics of the various accounts of the users. Embodiments of the present disclosure generated compressed account vectors and merchant vectors from the account characteristics vectors and merchant characteristics vectors. Embodiments of the present disclosure utilize the compressed account and merchant vectors to efficiently and accurately assist users to sort financial transactions into their accounts.

The disclosed method and system for accurately and efficiently assisting users of a data management system to sort financial transactions into accounts provides for significant improvements to the technical fields of electronic financial transaction data processing, data processing, data management, and user experience.

In addition, as discussed above, the disclosed method and system for accurately and efficiently assisting users of a data management system to sort financial transactions into accounts provide for the processing and storage of smaller amounts of data, i.e., more efficiently provide data management services; thereby eliminating unnecessary data analysis and storage. Consequently, using the disclosed method and system for accurately and efficiently assisting users of a data management system to sort financial transactions into accounts results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for accurately and efficiently assisting users of a data management system to sort financial transactions into accounts.

The production environment 100 includes a service provider computing environment 110, user computing environments 160, financial institution computing environments 170, and third-party computing environments 180, for accurately and efficiently assisting users of a data management system to sort financial transactions into accounts, according to various embodiments. The computing environments 110, 160, 170, and 180 are communicatively coupled to each other with one or more communication channels 101, according to various embodiments.

The service provider computing environment 110 represents one or more computing systems such as one or more servers and/or distribution centers that are configured to receive, execute, and host one or more data management systems (e.g., applications) for access by one or more users, for accurately and efficiently assisting users of a data management system to sort financial transactions into accounts, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a data management system 112, which is configured to provide data management services to a plurality of users.

According to one embodiment, the data management system 112 is an electronic bookkeeping accounting system that assists users in bookkeeping or other financial accounting practices. Additionally, or alternatively, the data management system can manage one or more of tax return preparation, banking, investments, loans, credit cards, real estate investments, retirement planning, bill pay, and budgeting. The data management system 112 can be a standalone system that provides data management services to users. Alternatively, the data management system 112 can be integrated into other software or service products provided by a service provider.

In one embodiment, the data management system 112 can assist users in tracking expenditures and revenues by retrieving financial transaction data related to financial transactions of users and by enabling the users to sort the financial transactions into accounts. Each user can have multiple accounts into which the user's financial transactions can be sorted. The data management system 112 enables the users to generate and name their various accounts and to use the accounts for their own financial tracking purposes. Because the names and purposes of the accounts are user generated, the types of accounts, or the way the users use the accounts may not be properly discernible by the data management system 112 based only on the names of the accounts.

In one embodiment, the data management system 112 can accurately and efficiently assist users to sort financial transactions into accounts regardless of the names of the accounts. The data management system 112 generates compressed merchant vectors and compressed account vectors from the account characteristics vectors and the merchant characteristics vectors. When a new financial transaction of the user is received by the data management system 112, the data management system 112 identifies the merchant associated with the financial transaction. The data management system then retrieves the compressed merchant vector associated with the merchant. The data management system also retrieves the compressed account vectors associated with each account of the user. The data management system then analyzes the compressed merchant vector and the compressed account vectors to identify one or more accounts of the user that are likely to be a fit for the financial transaction.

In one embodiment, after identifying the one or more accounts of the user, the data management system 112 can recommend that the user sort the financial transactions into one of the one or more identified accounts of the user. Alternatively, after the data management system 112 has identified one or more candidate accounts of the user, the data management system 112 can perform further analysis on the characteristics associated with the financial transaction in order to more definitively select one of the accounts of the user as the most probable account into which the user should sort the financial transaction. The data management system 112 can also automatically sort the financial transaction into the candidate account if the data management system 112 has identified a candidate account having a probability greater than a threshold probability of being the correct account into which the financial transaction should be sorted. Alternatively, the data management system 112 can present the one or more identified candidate accounts to the user and can prompt the user to select one of the accounts for the financial transaction. In this way, the data management system 112 can greatly reduce the amount of time users spend in sorting financial transactions into the various accounts of the users.

In one embodiment, the data management system 112 includes a user interface module 114, a user data management database 116, a data acquisition module 118, vector generation module 120, a vector compression and embedding module 122, and an account matching module 124, according to various embodiment.

The user computing environments 160 correspond to computing environments of the various users of the data management system 112. The users of the data management system 112 utilize the user computing environments 160 to interact with the data management system 112. The users of the data management system 112 can use the user computing environments 160 to provide data to the data management system 112 and to receive data, including data management services, from the data management system 112.

In one embodiment, the users of the data management system 112 can include companies, businesses, organizations, government entities, individuals, groups of individuals, or any other entities for which data management services would be beneficial, according to one embodiment. Businesses of all kinds, including large corporations, midsize companies, small businesses, or even sole proprietor businesses, can utilize the data management system 112 to track and sort their financial transactions into various accounts as a way to better manage their finances. Likewise, government organizations may use the data management system 112 to sort their financial transactions into accounts in order to track various types of expenditures and revenues. Organizations other than businesses and government entities, such as nonprofit organizations, may also utilize the data management system 112 for the purpose of monitoring and sorting expenditures and revenues. Furthermore, individuals may utilize the data management system 112 to track their own revenues and expenditures. Thus, the term "user" can refer to many types of entities.

Returning to the data management system 112, the user interface module 114 is configured to receive user data 132 from the users, according to one embodiment. The user data 132 includes information, such as, but not limited to a name of a business, and address of a business, data related to individuals associated with the business, employee data, payroll data, authentication data that enables the user to access the data management system, or any other types of data that a user may provide in working with the data management system 112.

In one embodiment, the user data 132 can include financial institution authentication data that enables the data management system 112 to access the financial accounts that the user has with third-party financial institutions or other third-parties. In one embodiment, the financial institution authentication data provided by the users as part of the user data 132 enables the data management system 112 to acquire information related to financial transactions of the users. The financial institution authentication data can include data that allows the data management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data of user data 132 can include usernames, passwords, bank account numbers, routing numbers, credit card numbers, answers to security questions, identification numbers, government identification numbers, birth dates, addresses, or other types of verification credentials that allow the data management system 112 to gain access to online services of third-party financial service institutions.

In one embodiment, the user data 132 can also include data provided by the users to create and name the various accounts that the users will use to sort and categorize financial transactions. These accounts can correspond to categories of revenues or expenses of the users into which financial transactions of the users can be sorted. The users can generate the accounts so that the data management system 112 can assist the users in better managing their finances.

In one embodiment, because the users can name the accounts however they like, it can be difficult to determine how the users use the accounts or how the users intend to use the accounts. For example, two businesses that use the data management system 112 may each have an account named "travel". The first business may utilize its "travel" account to track the traveling expenses of employees. These expenses may commonly include plane tickets, hotel charges, dinner expenses, taxi expenses, or other expenses commonly incurred when an individual travels for a meeting or conference. The second business may utilize its "travel" account primarily for expenses related to the maintenance of a fleet of company cars that sales people use as they travel about their respective regions making sales calls. Thus, the travel account of the second business may commonly include expenses such as gasoline, tire repair, monthly car payments, or new car purchases. Therefore, although the two accounts are similarly named, the types of expenses that are sorted into these accounts are quite different.

If a data management system were to try to sort new financial transactions of these two users into these accounts based only on their names, it is likely that the data management system would not properly sort the expenses in accordance with the purposes of at least one of the two companies.

Additionally, two companies may include accounts that are nearly identical in purpose but have entirely dissimilar names. For example, a first company may have an account titled stationary that includes expenses related to stocking office supplies such as paper, pens, printing ink, etc. A second company may have an account named simply with the initials PPI. The second company uses this account to track expenses related to the purchase of office supplies such as paper, pens, and ink for printers. Thus, even though the names of these two accounts are entirely dissimilar, they nevertheless are utilized for the same general purpose by the first and second companies.

If a data management system were to try to sort expenses related to these accounts, it is possible that a data management system would not properly sort financial transactions related to the account titled "stationary". However, it is unlikely that a data management system will properly sort expenses related to the account titled PPI. Thus, relying merely on the name of an account in order to understand the purpose of the account can lead to many problems.

Furthermore, it can be beneficial for a data management system or a data management system to understand the purposes of user generated accounts for purposes such as identifying companies with similar accounting practices or for other such purposes.

In one embodiment, the user interface module 114 provides interface content 134 to the user computing environments 160. The interface content 134 can include data enabling a user to obtain the current status of the user's accounts. For example, the interface content 134 can enable the user to select among the user's accounts in order to view financial transactions associated with the user's accounts. The interface content 134 can enable a user to view the overall state of many accounts. The interface content 134 can also enable a user to select among the various options in the data management system in order to fully utilize the services of the data management system. The user can provide user data 132 in conjunction with the interface content 134 in order to sort financial transactions of the user into the user's accounts.

In one embodiment, the data management system 112 includes a user data management database 116. The user data management database 116 includes the user data management data 136. The user data management data 136 can include data indicating the current status of all of the accounts of all of the users of the data management system. Thus, the user data management database 116 can include a vast amount of data related to the data management services provided to users. In one embodiment, when the user utilizes the interface module 114 to view interface content 134, the interface content 134 includes user data management data 136 retrieved from the user data management database 116.

In one embodiment, the user data management data 136 includes account data 138 and financial transaction data 140. The user data management data 136 can include, for each account of each user, a list of the financial transactions associated with the account. Thus, the user data management data 136 can include a large number of accounts and a large number of financial transactions that have been sorted into each account.

In one embodiment, each financial transaction in the user data management data 136 includes merchant identification data that identifies the merchant or vendor involved in the financial transaction. In one example, a particular user has an account for expenses related to food provided to employees during lunch meetings, for special occasions, for office parties, etc. The merchant identification data for these financial transactions may identify various restaurants, bakeries, grocery stores, and caterers. These restaurants, bakeries, grocery stores, and caterers are the merchants or vendors associated with the financial transactions associated with that account.

In one embodiment, the data acquisition module 118 is configured to use the financial institution authentication data provided in the user data 132 to acquire financial transaction data 140 related to financial transactions of the users from the financial institution computing environments 170. In particular, the data acquisition module 118 uses the financial institution authentication data to log into the online services of third-party financial institutions in order to retrieve financial transaction data 140 related to the financial transactions of users of the data management system 112. The data acquisition module 118 accesses the financial institutions by interfacing with the financial institution computing environments 170. The financial transaction data 140 can include bank account deposits, bank account withdrawals, credit card transactions, credit card balances, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, or any other types of financial transactions. The data acquisition module 118 is configured to gather the financial transaction data 140 from financial institution computing environments 170 related to financial service institutions with which one or more users of the data management system 112 have a relationship.

In one example, the data acquisition module 118 uses the financial institution authentication data to acquire data related to withdrawals, deposits, and balances in the bank accounts of users. The financial transaction data 140 includes data related to these withdrawals, deposits, and balances. Accordingly, the financial institution authentication data of user data 132 can include usernames, passwords, bank account numbers, routing numbers, or other validation credentials needed to access online services of various banking institutions.

In one embodiment, the financial transaction data 140 includes merchant identification data 142. Each financial transaction received in the financial transaction data 140 can include a merchant identification indicated by the merchant identification data 142. The data management system 112 can use the merchant identification data 142 to assist the users in sorting their financial transactions into the various accounts of the users.

In one embodiment, the merchant identification data 142 includes a merchant string. The merchant string can include a data string associated with a credit card transaction, a bank transaction, a checking account transaction, an online payment transaction, or other kinds of financial transactions. The merchant string for a given financial transaction may include a name of the merchant involved in the financial transaction, a part of the name of the merchant, a code associated with the merchant, an address associated with the merchant, or other types of data that can potentially identify the merchant.

In one embodiment, the data acquisition module 118 is configured to acquire data from third-party computing environments 180. The data acquisition module 118 can request and receive data from the third-party computing environments 180 to supply or supplement the financial transaction data 140, according to one embodiment. In one embodiment, the third-party computing environments 180 automatically transmit financial data to the data management system 112 (e.g., to the data acquisition module 118), to be merged into the financial transaction data 140. The third-party computing environment 180 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the data management system 112 can keep a list of the financial transactions and their associated merchant identification data 142 so that users can access the user data management data 136 and see a list of financial transactions to be sorted into the accounts of the users. The users can then sort the financial transactions into the accounts. Alternatively, the data acquisition module 118 can automatically sort some of the financial transactions into the accounts of the users. However, as described previously, it can be difficult to sort financial transactions into the accounts when the nature of the accounts is not fully understood by the data management system 112, and when the user has not previously had financial transactions with a particular merchant.

In one embodiment, the data management system 112 utilizes the vector generation module 120 to generate account characteristics vector data 144 including account characteristics vectors that each represent a respective account of one of the users. The vector generation module 120 can also generate merchant characteristics vector data 146 including merchant characteristics vectors that each represent a respective merchant, merchant string, or merchant identifier associated with financial transactions.

In one embodiment, the account characteristics vector data 144 includes, for each account in the account data 138, a respective account characteristics vector. Thus, in one embodiment the vector generation module 120 generates one account characteristics vector for each account. If the data management system 112 includes millions of users each having multiple accounts, then the account characteristics vector data 144 can include many millions of account characteristics vectors. These account characteristics vectors can be used to assist users to sort financial transactions into the accounts, according to one embodiment.

In one embodiment, each account characteristics vector in the account characteristics vector data 144 includes a plurality of data fields. In one embodiment, each data field corresponds to a respective merchant or merchant identification. Each data field includes a respective data value. The data value is an indication of a number, frequency, or rate of financial transactions involving the merchant that have been sorted into the account. Thus, in one embodiment, a higher data value indicates a higher number, proportion, or rate of occurrence of financial transactions involving the merchant and assigned to that account. A data value of zero can indicate that either no financial transactions associated with that merchant have been sorted into that account, or that a statistically insignificant number of financial transactions involving the merchant have been sorted into that account.

In one embodiment, because some businesses or organizations may be much larger than other businesses or organizations, the sheer number of financial transactions for those businesses or organizations may be much higher than the number of financial transactions for other businesses or organizations that are smaller. Thus, merely listing, as a data value for a data field of an account characteristics vector, the number of transactions that involve a particular merchant may not be as meaningful when assisting users to sort financial transactions into an account. Accordingly, in one embodiment, the data values in the respective data fields of an account characteristics vector can be normalized data values. For example, the data values can be normalized such that each data value represents a proportion of the total number of financial transactions. In one embodiment, the data values can be weighted. In one embodiment, the data values can represent a simple percentage of the total number of financial transactions that involve that merchant. These ways of generating data values for the various data fields of the account characteristics vectors can be more useful when utilizing the account characteristics vectors to identify candidate accounts for future transactions.

In one embodiment, the vector generation module 120 generates the data values for the data fields of the account characteristics vectors using a term frequency inverse document frequency (TF-IDF) process. In the TF-IDF process for generating a single data value in a single data field of a single account characteristics vector, the vector generation module 120 counts the fraction of financial transactions that are assigned to that account and involve the merchant associated with the data field. The vector generation module 120 then counts the total number of accounts that include a financial transaction involving the relevant merchant. The vector generation module 120 then generates the data value by multiplying the fraction of financial transactions involving the merchant from the account by the logarithm of the inverse of the total fraction of accounts that include a financial transaction with the merchant that corresponds to the data field for which the data value is being computed. The vector generation module 120 can generate data values for each data field of the account characteristics vector using the TF-IDF process. The vector generation module 120 can generate an account characteristics vector for each account in the user data management database 116.

In one embodiment, the account characteristics vector generation module 120 can generate the data values for the data fields of the account characteristics vectors by taking the logarithm of the result of the TF-IDF process. Thus, the data value in a given data field of a given account vector can correspond to the logarithm of a number generated by the TF-IDF process. In one embodiment, the vector generation module 120 uses a base 2 logarithm for the calculation. Alternatively, the vector generation module 120 can use a logarithm with a base other than 2.

In one embodiment, each data field of an account characteristics vector can correspond to a group of merchants or merchant identifications. For example, rather than having a data field for each merchant gas station, a single data field can correspond to multiple gas stations. Each gas station may have its own merchant identification. Thus, a single data field may correspond to multiple merchant identifications for the various gas stations in the group. Thus, when generating a data value for the data field, the number of financial transactions for each of the gas stations in the group can be summed together to provide a data value. This sum can then be weighted, averaged, normalized, passed through a TF-IDF process, or otherwise processed to generate the data value for the data field.

In one embodiment, the vector generation module 120 generates merchant characteristics vector data 146 in a similar manner as the account characteristics vector data 144. In one embodiment, the merchant characteristics vector data 146 includes, for each merchant or merchant string known to the data management system 112, a respective merchant characteristics vector. Thus, in one embodiment the vector generation module 120 generates one merchant characteristics vector for each merchant or merchant string. These merchant characteristics vectors can be used to assist users in sorting financial transactions into their accounts, according to one embodiment.

In one embodiment, each merchant characteristics vector in the merchant characteristics vector data 146 includes a plurality of data fields. In one embodiment, each data field corresponds to a respective merchant. Each data field includes a respective data value. The data value is an indication of a number, frequency, or rate of financial transactions involving that merchant associated with the data field and the merchant associated with the merchant characteristics vector have been sorted into a same account. Thus, in one embodiment, a higher data value indicates a higher number, proportion, or rate of co-assignment to a same account of financial transactions involving the merchant associated with the data field and financial transactions involving the merchant associated with the merchant characteristics vector. A data value of zero can indicate that either no financial transactions involving the merchants have been sorted to a same account, or that a statistically insignificant number of financial transactions involving the merchants have been sorted into a same account.

In one embodiment, the merchant characteristics vectors in the account characteristics vectors have a same number of data fields. The data fields of the merchant characteristics vectors and the account characteristics vectors correspond to the same merchants. In other words, the first data field in each of the account characteristics vectors and merchant characteristics vectors are associated with same merchant. The second data field in each of the account characteristics vectors and merchant characteristics vectors are associated with a same merchant. The nth data field in each of the account characteristics vectors and merchant characteristics vectors are associated with a same merchant. This enables account characteristics vectors and merchant characteristics vectors to be utilized effectively in assisting users to sort new financial transactions into their accounts, as will be set forth in more detail below.

In one embodiment, when a new financial transaction data 140 is received for a financial transaction of a user, the data management system 112 can utilize the account characteristics vector data 144 and the merchant characteristics vector data 146 to identify an account of the user into which the financial transaction should be sorted or assigned. In particular, the data management system 112 can identify the merchant involved in the financial transaction, for example by analyzing the merchant identification data 142. The data management system 112 can then retrieve the merchant characteristics vector associated with that merchant. The data management system 112 can then retrieve the account characteristics vectors associated with each of the accounts of the user. The data management system 112 can embed the merchant characteristics vector and the account characteristics vectors into a vector space. The data management system 112 can then identify which of the account characteristics vectors are closest in proximity to the merchant characteristics vector, either in terms of angle between the vectors or translational distance between vectors. Because each of the data fields in the merchant characteristics vector and the account characteristics vectors correspond to the same merchants, the proximity or similarity between the merchant characteristics vectors and an account characteristics vector corresponds to a similarity in the vectors. The account characteristics vector that is closest to or most similar to the merchant characteristics vector is the account that is most likely to be a fit for the financial transaction. In this way, the data management system 112 can utilize the account characteristics vector data 144 and the merchant characteristics vector data 146 to identify one or more accounts of a user that are most likely fits for a financial transaction.

While this process is effective for identifying candidates accounts of the user for a financial transaction, this process also suffers from some drawbacks. For example, due to the very large number of merchants known to the data management system 112, the vectors have a very large number of dimensions or data fields; one dimension or data field for each known merchant. For large number of these data fields, the data value will be zero or some other very small number. This introduces "noise" into the system. The noise can distort or reduce the meaningfulness of more significant data values. The result is that inaccuracies can be introduced when determining which account characteristics vectors are most similar to, or closest to, the merchant characteristics vector. Accordingly, the data management system 112 can possibly provide faulty candidate accounts or otherwise poorly assist users to sort financial transactions into their accounts.

Furthermore, the very large number of data fields in each of the merchant and account characteristics vectors results in an efficient use of system resources when trying to identify candidates accounts for financial transaction. If the account and merchant characteristics vectors have many thousands or even millions of data fields, then the computations or processes by which candidates accounts are identified can utilize large amounts of processing, memory, and data transmission resources.

In one embodiment, in order to overcome these drawbacks and to more accurately and efficiently assist users in sorting financial transactions into their accounts, the data management system utilizes the vector compression and embedding module 122 to compress the account characteristics vectors and the merchant characteristics vectors. In particular, the vector compression and embedding module 122 reduces the dimensionality of the account characteristics vectors and merchant characteristics vectors by performing one or more compression processes or algorithms on the account characteristics vectors and the merchant characteristics vectors.

In one embodiment, the vector compression and embedding module 122 generates compressed account vector data 148. The vector compression and embedding module 122 receives or retrieves the account characteristics vector data 144 and applies one or more compression techniques to the account characteristics vectors. The compression techniques and processes result in compressed account vector data 148 that includes compressed account vectors. Each compressed account vector corresponds to a compressed version of a respective account characteristics vector.

In one embodiment, the vector compression and embedding module 122 generates compressed merchant vector data 150. The vector compression and embedding module 122 receives or retrieves the merchant characteristics vector data 146 and applies one or more compression techniques to the merchant characteristics vectors. The compression techniques and processes result in compressed merchant vector data 150 that includes compressed merchant vectors. Each compressed merchant vector corresponds to a compressed version of a respective merchant characteristics vector.

In one embodiment, the compressed account and merchant vectors include a significantly reduced number of data fields or dimensions with respect to the account characteristics vectors and merchant characteristics vectors. In one example, the account characteristics vectors and merchant characteristics vectors may have a million or more data fields, while the compression techniques result in compressed account and merchant vectors that have less than a thousand data fields. In one example, the account characteristics vectors and merchant characteristics vectors have less than one hundred data fields. This results in both an increase in accuracy when identifying candidates accounts, and an increase in efficiency in utilizing computing resources. In one embodiment, the number of data fields in the compressed vectors can be selected based on factors including the number of data fields in the uncompressed vectors, the noise present in the uncompressed vectors, the data values in the data fields of the uncompressed vectors, the needed efficiency in utilization of processing, memory, and data transmission resources, and the needed accuracy in identifying candidates accounts.

In one embodiment, the compression techniques applied by the vector compression and embedding module 122 maintain the same relationships between the compressed account and merchant vectors as existed between the merchant characteristics vectors and the account characteristics vectors. In other words, the relative angles between the vectors are maintained, in one embodiment. If a first account characteristics vector was closer in proximity to a merchant characteristics vector than was a second account characteristics vector in the uncompressed vector space, then the corresponding compressed account vectors will retain their relative proximity to the corresponding compressed merchant vector in the compressed vector space. This retention of relative proximity enables the data management system 112 to accurately identify candidate accounts based on vector proximity even though the vector space has been greatly compressed. In one embodiment, the relative proximity is not perfectly retained, but is substantially retained in a manner that still enables accurate identification of candidate accounts.

In one embodiment, the vector compression and embedding module 122 utilizes a latent semantic indexing (LSI) process on the account characteristics vector data 144 and the merchant characteristics vector data 146 in order to generate the compressed account vector data 148 and the compressed merchant vector data 150. The LSI process includes iteratively reducing the number of dimensions and adjusting the data values in a way that maintains the spatial and/or angular relationships between the vectors. This process proceeds until the vectors have been reduced to a selected number of dimensions.

In one embodiment, the vector compression and embedding module 122 utilizes a Word2Vec process, or skip-gram with negative sampling, to generate the compressed account vector data 148 and the compressed merchant vector data 150 from the account characteristics vector data 144 and the merchant characteristics vector data 146. In one embodiment, the Word2Vec process takes each uncompressed vector and compresses the vector to a selected length, reduced with respect to the uncompressed vector. The Word2Vec process takes the uncompressed vectors as input "words", even though they are themselves vectors, and converts them into vectors of the selected compressed length while retaining the spatial and/or angular relationships between the vectors.

In one embodiment, the compressed account vector data 148 is generated based on the compressed merchant data. In this case the compressed account vectors are not generated from uncompressed account vectors, but from compressed merchant vectors.

In one embodiment, each compressed account vector is generated by identifying the merchants for which transactions have been sorted into the account and summing the compressed merchant vectors associated with those merchants. This results in account vectors that have the same length as the compressed merchant vectors.

In one embodiment, the data management system 112 utilizes the account matching module 124 to assist users in sorting financial transactions into their accounts. In particular, when the data management system 112 receives financial transaction data 140 corresponding to a new financial transaction of the user, the account matching module 124 proceeds to assist the user in sorting the new financial transaction into an account of the user.

In one embodiment, the account matching module 124 identifies the merchant involved in the new transaction and retrieves the compressed merchant vector data 150 corresponding to a merchant involved in the new transaction. The account matching module 124 also retrieves the compressed account vectors for each of the accounts of the user. The account matching module 124 then generates a vector proximity data 154 identifying the proximity of each of the compressed account vectors to the compressed merchant vector. The vector proximity data 154 can indicate one or more candidate accounts that are closest to the compressed merchant vector in terms of angle or space. In one embodiment, the account matching module 124 is a part of the vector compression and embedding module 122.

In one embodiment, the account matching module 124 identifies candidate accounts by calculating the inner products of the compressed merchant vector and each of the compressed account vectors associated with the user. In one embodiment, calculating the inner product includes multiplying the lengths of the two vectors by the cosine of the angle between. The compressed account vectors that result in the largest inner product with the compressed merchant vector are the accounts that are likeliest to be the correct account into which the new financial transaction should be sorted or assigned. Alternatively, the account matching module 124 can utilize other techniques to identify which compressed account vectors are closest to the compressed merchant vector spatially and/or angularly.

In one embodiment, at this stage the account matching module 124 may have identified a single candidate account, two or three candidate accounts, or more than three candidate accounts into which the financial transaction could be sorted. The account matching module 124 can proceed in several ways. The account matching module 124 can decide that further analysis is needed to identify the most likely candidate account into which the financial transaction should be sorted. The account matching module 124 can determine that a small number of candidate accounts have been identified and that the user can now sort the financial transaction into the proper account. The account matching module 124 can determine that a single candidate account has been identified having a greater than threshold probability of being correct and that the user should now be presented with the candidate account so that the user can sort the financial transaction into the candidate account, or that the account matching module 124 automatically sort the financial transaction into the candidate account.

In one embodiment, the account matching module 124 generates message data 155 and the user interface module 114 presents the message data 155 to the user via the interface content 134. The message data 155 can include text, graphics, or sound indicating to the user that one or more candidate accounts has been identified and that the user should now sort the financial transaction into one of these candidate accounts. The message data 155 can present to the user the candidate accounts in order of greatest probability of being the correct candidate account as identified by the account matching module 124. The user can then select an account and the data management system 112 will sort the financial transaction into the account selected by the user. Alternatively, the message data 155 can identify single candidate account and can prompt the user to select or approve the sorting of the financial transaction into that account. Alternatively, the message data 155 can inform the user that the data management system 112 has sorted the financial transaction into a particular account. The message data 155 can include an opportunity for the user to approve or undo the sorting of the financial transactions into the account. Thus, the account matching module 124 generates message data that either assists the user to sort a financial transaction into an account or informs the user that the financial transaction has been sorted into an account.

In one embodiment, as set forth above, there are instances in which after the account matching module 124 has identified multiple candidate the accounts based on the account grouping data, the transaction grouping data, and the user grouping data, in which no account or accounts of the user have been identified as being the most likely accounts to which the financial transaction should be sorted. In this case, the account matching module 124 performs additional analysis to identify one or more candidate accounts. In particular, the account matching module 124 can further analyze the financial transaction data related to the financial transaction in order to identify further characteristics of the financial transaction beyond merely the merchant or merchant string associated with the financial transaction. The account matching module 124 can identify from the financial transaction data, financial transaction description data that describes characteristics of the financial transaction. In addition to a merchant identification or merchant string, the financial transaction description data can include monetary value of the financial transaction, a business category code, financial account, a day of the week that the financial transaction occurred, a time of day that the financial transaction occurred, a geolocation associated with the financial transaction cluster, or other characteristics associated with the financial transaction. The account matching module 124 can consider each of these characteristics of the financial transaction, as well as the group of financial transactions (or group of merchants) merchants and group of accounts assigned to the financial transaction and can identify an account of the user that is most likely to be the correct account into which the financial transaction should be sorted based on these characteristics.

Additional information related to using vectors in an electronic data management system can be found in U.S. patent application Ser. No. 15/496,630, filed Apr. 25, 2017, titled "METHOD TO USE TRANSACTION, ACCOUNT, AND COMPANY SIMILARITY CLUSTERS DERIVED FROM THE HISTORIC TRANSACTION DATA TO MATCH NEW TRANSACTIONS TO ACCOUNTS". U.S. patent application Ser. No. 15/496,630 is incorporated herein by reference in its entirety.

Embodiments of the present disclosure address some of the shortcomings associated with traditional data management systems. Candidate accounts are identified in an efficient and accurate manner. Therefore, the various described embodiments of the disclosure and their associated benefits amount to significantly more than an abstract idea. In particular, by generating merchant characteristics vectors and account characteristics vectors, and then compressing the merchant characteristics vectors and the account characteristics vectors prior to identifying candidate accounts, the accuracy and efficiency of matching financial transactions to accounts is significantly improved.

Figure 2:
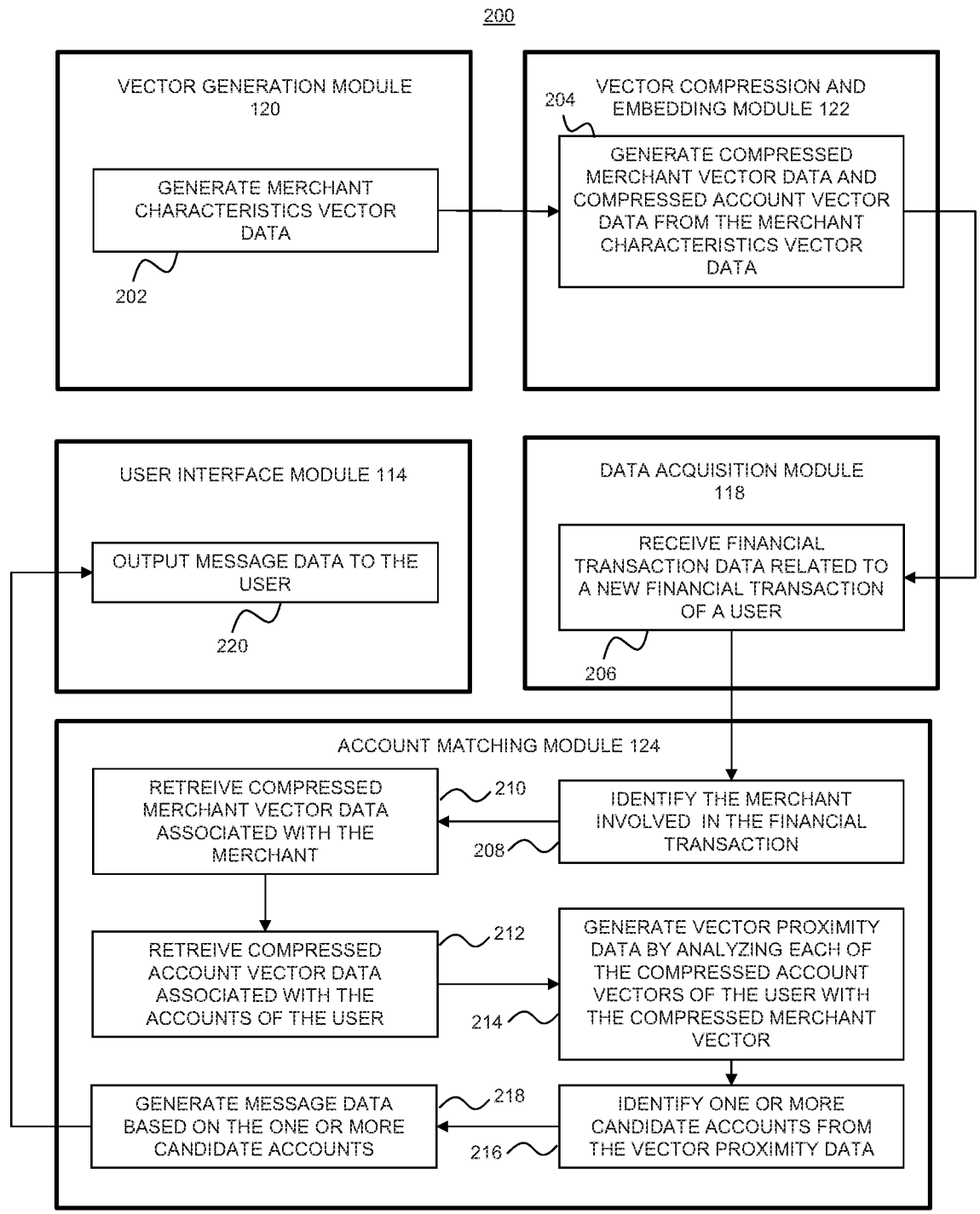
FIG. 2 is a block diagram of a process for accurately and efficiently assisting users of a data management system to sort financial transactions into accounts, in accordance with one embodiment.

FIG. 2 illustrates a functional flow diagram of a process 200 for accurately and efficiently assisting users of a data management system to sort financial transactions into accounts, in accordance with one embodiment.

Referring to FIG. 2, FIG. 1, and the description of FIG. 1 above, at block 202 the vector generation module 120 generates merchant characteristics vector data, using any of the methods, processes, and procedures discussed above with respect to FIG. 1, according to one embodiment. From block 202 the process proceeds to block 204.

At block 204 the vector compression and embedding module 122 generates compressed merchant vector data and compressed account vector data from the merchant characteristics vector data, using any of the methods, processes, and procedures discussed above with respect to FIG. 1, according to one embodiment. From block 204 the process proceeds to block 206.

At block 206 the data acquisition module 118 receives financial transaction data related to a new financial transaction of a user, using any of the methods, processes, and procedures discussed above with respect to FIG. 1, according to one embodiment. From block 206 the process proceeds to block 208.

At block 208 the account matching module 124 identifies the merchant involved in the financial transaction, using any of the methods, processes, and procedures discussed above with respect to FIG. 1, according to one embodiment. From block 208 the process proceeds to block 210.

At block 210 the account matching module 124 retrieves compressed merchant vector data associated with the merchant, using any of the methods, processes, and procedures discussed above with respect to FIG. 1, according to one embodiment. From block 210 the process proceeds to block 212.

At block 212 the account matching module 124 retrieves compressed account vector data associated with the accounts of the user, using any of the methods, processes, and procedures discussed above with respect to FIG. 1, according to one embodiment. From block 212 the process proceeds to block 214.

At block 214 the account matching module 124 generates vector proximity data by analyzing each of the compressed account vectors of the user with the compressed merchant vector, using any of the methods, processes, and procedures discussed above with respect to FIG. 1, according to one embodiment. From block 214 the process proceeds to block 216.

At block 216 the account matching module 124 identifies one or more candidate accounts from the vector proximity data, using any of the methods, processes, and procedures discussed above with respect to FIG. 1, according to one embodiment. From block 216 the process proceeds to block 218.

At block 218 the account matching module 124 generates message data based on the one or more candidate accounts, using any of the methods, processes, and procedures discussed above with respect to FIG. 1, according to one embodiment. From block 218 the process proceeds to block 220.

At block 220 user interface module 114 outputs the message data to the user, using any of the methods, processes, and procedures discussed above with respect to FIG. 1, according to one embodiment.

Those of skill in the art will recognize, in light of the present disclosure, that the process 200 can include different steps and different orders of steps, other than those represented in FIG. 2. All such other processes fall within the scope of the present disclosure.

Figure 3:
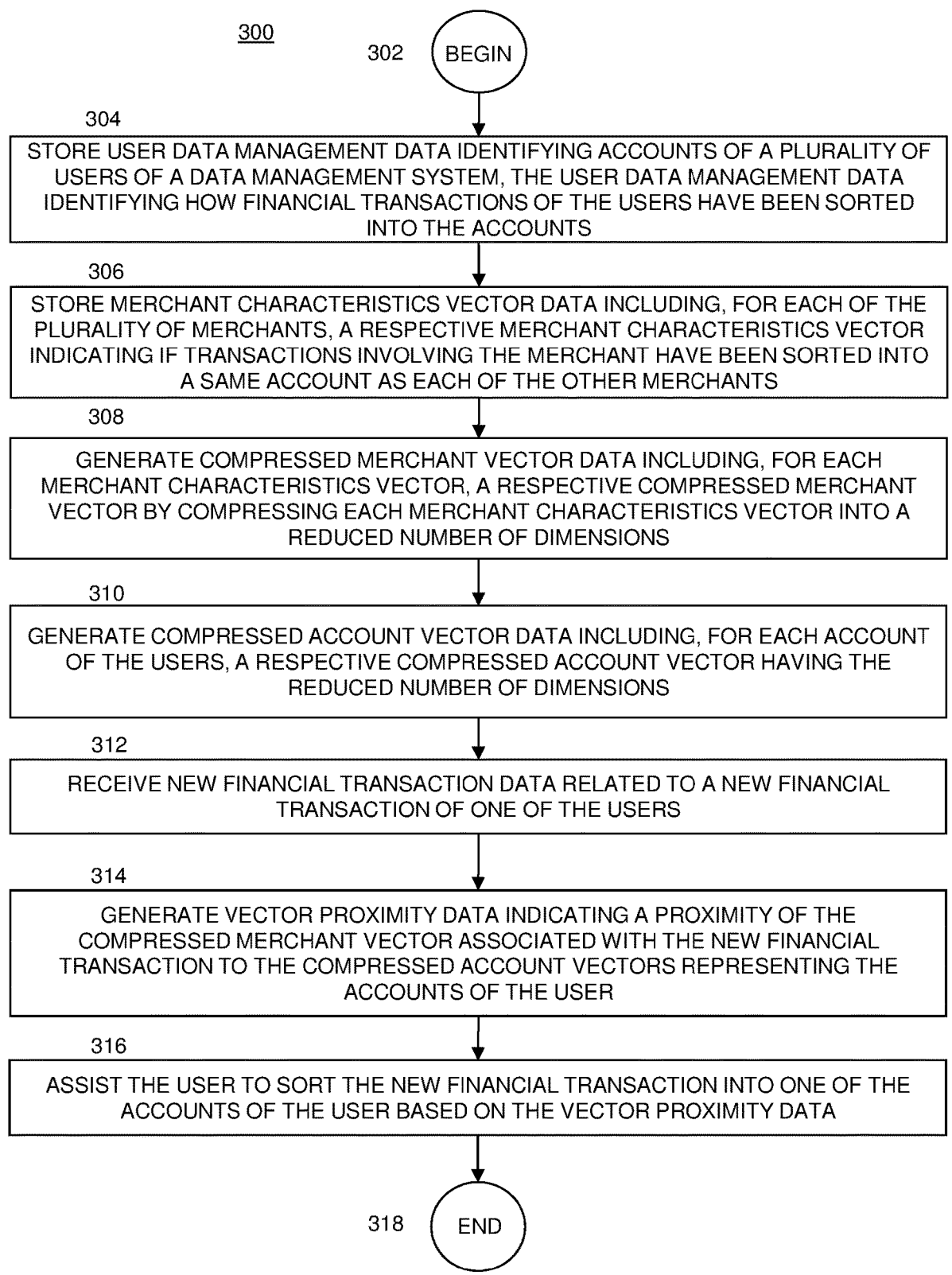
FIG. 3 is a flow diagram of a process for accurately and efficiently assisting users of a data management system to sort financial transactions into accounts, in accordance with one embodiment.

FIG. 3 illustrates a flow diagram of a process 300 for accurately and efficiently assisting users of a data management system to sort financial transactions into accounts, according to various embodiments.

Referring to FIGS. 1-3, and the description of FIGS. 1-2 above, in one embodiment, process 300 begins at BEGIN 302 and process flow proceeds to STORE USER DATA MANAGEMENT DATA IDENTIFYING ACCOUNTS OF A PLURALITY OF USERS OF A DATA MANAGEMENT SYSTEM, THE USER DATA MANAGEMENT DATA IDENTIFYING HOW FINANCIAL TRANSACTIONS OF THE USERS HAVE BEEN SORTED INTO THE ACCOUNTS 304.

In one embodiment, at STORE USER DATA MANAGEMENT DATA IDENTIFYING ACCOUNTS OF A PLURALITY OF USERS OF A DATA MANAGEMENT SYSTEM, THE USER DATA MANAGEMENT DATA IDENTIFYING HOW FINANCIAL TRANSACTIONS OF THE USERS HAVE BEEN SORTED INTO THE ACCOUNTS 304, user data management data is stored identifying accounts of a plurality of users of a data management system, the user data management data identifying how financial transactions of the users have been sorted into the accounts, using any of the methods, processes, and procedures discussed above with respect to FIGS. 1-2.

In one embodiment, once user data management data is stored identifying accounts of a plurality of users of a data management system, the user data management data identifying how financial transactions of the users have been sorted into the accounts at STORE USER DATA MANAGEMENT DATA IDENTIFYING ACCOUNTS OF A PLURALITY OF USERS OF A DATA MANAGEMENT SYSTEM, THE USER DATA MANAGEMENT DATA IDENTIFYING HOW FINANCIAL TRANSACTIONS OF THE USERS HAVE BEEN SORTED INTO THE ACCOUNTS 304 process flow proceeds to STORE MERCHANT CHARACTERISTICS VECTOR DATA INCLUDING, FOR EACH OF THE PLURALITY OF MERCHANTS, A RESPECTIVE MERCHANT CHARACTERISTICS VECTOR INDICATING IF TRANSACTIONS INVOLVING THE MERCHANT HAVE BEEN SORTED INTO A SAME ACCOUNT AS EACH OF THE OTHER MERCHANTS 306.

In one embodiment, at STORE MERCHANT CHARACTERISTICS VECTOR DATA INCLUDING, FOR EACH OF THE PLURALITY OF MERCHANTS, A RESPECTIVE MERCHANT CHARACTERISTICS VECTOR INDICATING IF TRANSACTIONS INVOLVING THE MERCHANT HAVE BEEN SORTED INTO A SAME ACCOUNT AS EACH OF THE OTHER MERCHANTS 306, merchant characteristics vector data is stored including, for each of the plurality of merchants, a respective merchant characteristics vector indicating if transactions involving the merchant have been sorted into a same account as each of the other merchants, using any of the methods, processes, and procedures discussed above with respect to FIGS. 1-2.

In one embodiment, once merchant characteristics vector data is stored including, for each of the plurality of merchants, a respective merchant characteristics vector indicating if transactions involving the merchant have been sorted into a same account as each of the other merchants at STORE MERCHANT CHARACTERISTICS VECTOR DATA INCLUDING, FOR EACH OF THE PLURALITY OF MERCHANTS, A RESPECTIVE MERCHANT CHARACTERISTICS VECTOR INDICATING IF TRANSACTIONS INVOLVING THE MERCHANT HAVE BEEN SORTED INTO A SAME ACCOUNT AS EACH OF THE OTHER MERCHANTS 306, process flow proceeds to GENERATE COMPRESSED MERCHANT VECTOR DATA INCLUDING, FOR EACH MERCHANT CHARACTERISTICS VECTOR, A RESPECTIVE COMPRESSED MERCHANT VECTOR BY COMPRESSING THE MERCHANT CHARACTERISTICS VECTOR INTO A REDUCED NUMBER OF DIMENSIONS 308.

In one embodiment, at GENERATE COMPRESSED MERCHANT VECTOR DATA INCLUDING, FOR EACH MERCHANT CHARACTERISTICS VECTOR, A RESPECTIVE COMPRESSED MERCHANT VECTOR BY COMPRESSING THE MERCHANT CHARACTERISTICS VECTOR INTO A REDUCED NUMBER OF DIMENSIONS 308, compressed merchant vector data is generated including, for each merchant characteristics vector, a respective compressed merchant vector by compressing the merchant characteristics vector into a reduced number of dimensions, using any of the methods, processes, and procedures discussed above with respect to FIGS. 1-2.

In one embodiment, once compressed merchant vector data is generated including, for each merchant characteristics vector, a respective compressed merchant vector by compressing the merchant characteristics vector into a reduced number of dimensions at GENERATE COMPRESSED MERCHANT VECTOR DATA INCLUDING, FOR EACH MERCHANT CHARACTERISTICS VECTOR, A RESPECTIVE COMPRESSED MERCHANT VECTOR BY COMPRESSING THE MERCHANT CHARACTERISTICS VECTOR INTO A REDUCED NUMBER OF DIMENSIONS 308, process flow proceeds to GENERATE COMPRESSED ACCOUNT VECTOR DATA INCLUDING, FOR EACH ACCOUNT OF THE USERS, A RESPECTIVE COMPRESSED ACCOUNT VECTOR HAVING THE REDUCED NUMBER OF DIMENSIONS 310.

In one embodiment, at GENERATE COMPRESSED ACCOUNT VECTOR DATA INCLUDING, FOR EACH ACCOUNT OF THE USERS, A RESPECTIVE COMPRESSED ACCOUNT VECTOR HAVING THE REDUCED NUMBER OF DIMENSIONS 310, compressed account vector data is generated including, for each account of the users, a respective compressed account vector having the reduced number of dimensions, using any of the methods, processes, and procedures discussed above with respect to FIGS. 1-2.

In one embodiment, once compressed account vector data is generated including, for each account characteristics vector, a respective compressed account vector having the reduced number of dimensions at GENERATE COMPRESSED ACCOUNT VECTOR DATA INCLUDING, FOR EACH ACCOUNT OF THE USERS, A RESPECTIVE COMPRESSED ACCOUNT VECTOR HAVING THE REDUCED NUMBER OF DIMENSIONS 310, process flow proceeds to RECEIVE NEW FINANCIAL TRANSACTION DATA RELATED TO A NEW FINANCIAL TRANSACTION OF ONE OF THE USERS 312.

In one embodiment, at RECEIVE NEW FINANCIAL TRANSACTION DATA RELATED TO A NEW FINANCIAL TRANSACTION OF ONE OF THE USERS 312, new financial transaction data is received related to a new financial transaction of one of the users, using any of the methods, processes, and procedures discussed above with respect to FIGS. 1-2.

In one embodiment, once new financial transaction data is received related to a new financial transaction of one of the users at RECEIVE NEW FINANCIAL TRANSACTION DATA RELATED TO A NEW FINANCIAL TRANSACTION OF ONE OF THE USERS 312, process flow proceeds to GENERATE VECTOR PROXIMITY DATA INDICATING A PROXIMITY OF THE COMPRESSED MERCHANT VECTOR ASSOCIATED WITH THE NEW FINANCIAL TRANSACTION TO THE COMPRESSED ACCOUNT VECTORS REPRESENTING THE ACCOUNTS OF THE USER 314.

In one embodiment, at GENERATE VECTOR PROXIMITY DATA INDICATING A PROXIMITY OF THE COMPRESSED MERCHANT VECTOR ASSOCIATED WITH THE NEW FINANCIAL TRANSACTION TO THE COMPRESSED ACCOUNT VECTORS REPRESENTING THE ACCOUNTS OF THE USER 314, vector proximity data is generated indicating a proximity of the compressed merchant vector associated with the new financial transaction to the compressed account vectors representing the accounts of the user, using any of the methods, processes, and procedures discussed above with respect to FIGS. 1-2.

In one embodiment, once vector proximity data is generated indicating a proximity of the compressed merchant vector associated with the new financial transaction to the compressed account vectors representing the accounts of the user at GENERATE VECTOR PROXIMITY DATA INDICATING A PROXIMITY OF THE COMPRESSED MERCHANT VECTOR ASSOCIATED WITH THE NEW FINANCIAL TRANSACTION TO THE COMPRESSED ACCOUNT VECTORS REPRESENTING THE ACCOUNTS OF THE USER 314, process flow proceeds to ASSIST THE USER TO SORT THE NEW FINANCIAL TRANSACTION INTO ONE OF THE ACCOUNTS OF THE USER BASED ON THE VECTOR PROXIMITY DATA 316.

In one embodiment, at ASSIST THE USER TO SORT THE NEW FINANCIAL TRANSACTION INTO ONE OF THE ACCOUNTS OF THE USER BASED ON THE VECTOR PROXIMITY DATA 316, the user is assisted to sort the new financial transaction into one of the accounts of the user based on the vector proximity data, using any of the methods, processes, and procedures discussed above with respect to FIGS. 1-2.

In one embodiment, once the user is assisted to sort the new financial transaction into one of the accounts of the user based on the vector proximity data at ASSIST THE USER TO SORT THE NEW FINANCIAL TRANSACTION INTO ONE OF THE ACCOUNTS OF THE USER BASED ON THE VECTOR PROXIMITY DATA 316, process flow proceeds to END 318.

In one embodiment, at END 318 the process for accurately and efficiently assisting users of a data management system to sort financial transactions into accounts is exited to await new data and/or instructions.

Figure 4:
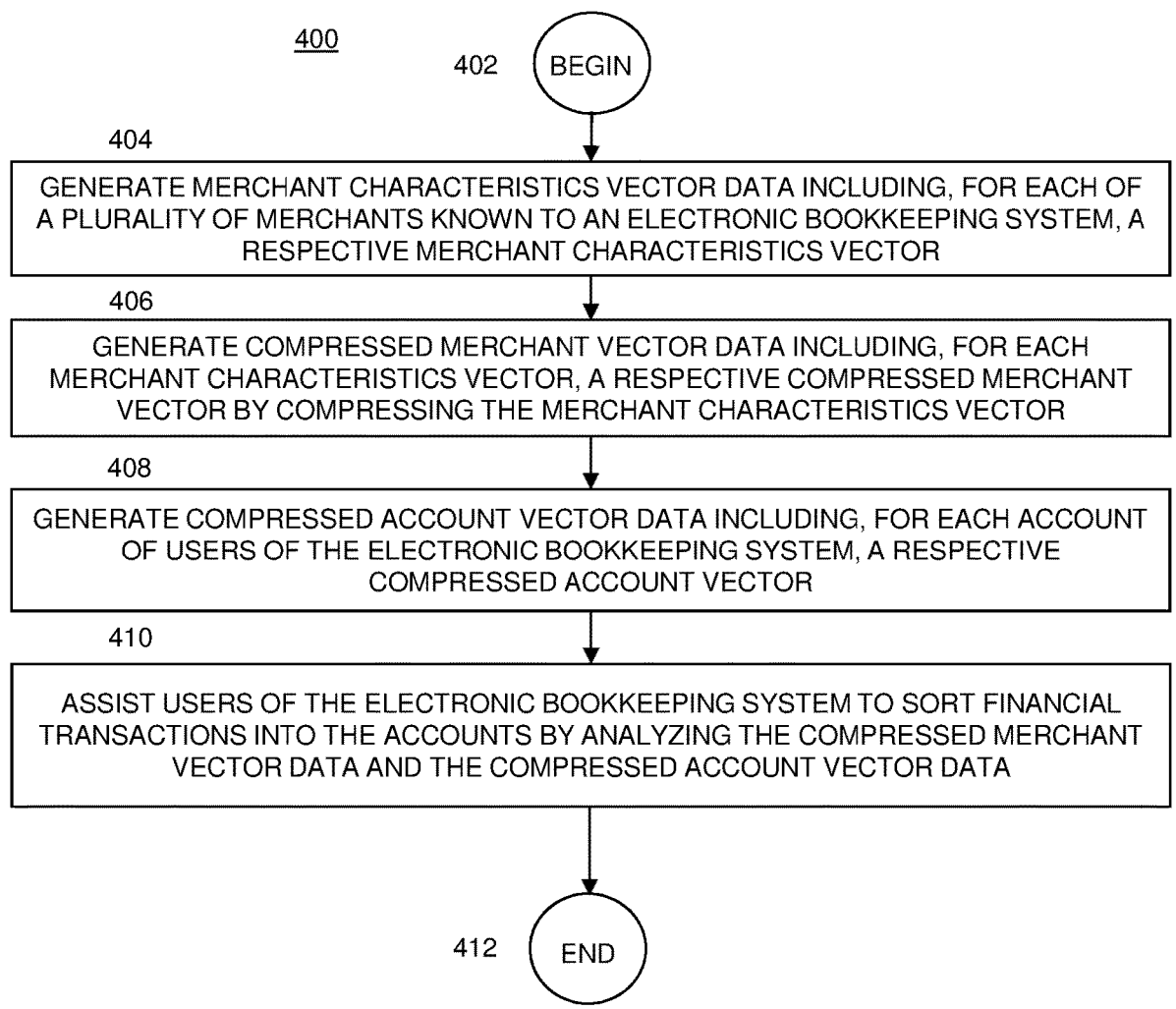
FIG. 4 is a flow diagram of a process for accurately and efficiently assisting users of a data management system to sort financial transactions into accounts, in accordance with one embodiment.

FIG. 4 illustrates a flow diagram of a process 400 for accurately and efficiently assisting users of a data management system to sort financial transactions into accounts, according to various embodiments.

Referring to FIG. 4, FIGS. 1-2, and the description of FIGS. 1-2 above, in one embodiment, process 400 begins at BEGIN 402 and process flow proceeds to GENERATE MERCHANT CHARACTERISTICS VECTOR DATA INCLUDING, FOR EACH OF A PLURALITY OF MERCHANTS KNOWN TO AN ELECTRONIC BOOKKEEPING SYSTEM, A RESPECTIVE MERCHANT CHARACTERISTICS VECTOR 404.

In one embodiment, at GENERATE MERCHANT CHARACTERISTICS VECTOR DATA INCLUDING, FOR EACH OF A PLURALITY OF MERCHANTS KNOWN TO AN ELECTRONIC BOOKKEEPING SYSTEM, A RESPECTIVE MERCHANT CHARACTERISTICS VECTOR 404, merchant characteristics vector data is generated including, for each of a plurality of merchants known to an electronic bookkeeping system, a respective merchant characteristics vector, using any of the methods, processes, and procedures discussed above with respect to FIGS. 1-2.

In one embodiment, once merchant characteristics vector data is generated including, for each of a plurality of merchants known to an electronic bookkeeping system, a respective merchant characteristics vector at GENERATE MERCHANT CHARACTERISTICS VECTOR DATA INCLUDING, FOR EACH OF A PLURALITY OF MERCHANTS KNOWN TO AN ELECTRONIC BOOKKEEPING SYSTEM, A RESPECTIVE MERCHANT CHARACTERISTICS VECTOR 404, process flow proceeds to GENERATE COMPRESSED MERCHANT VECTOR DATA INCLUDING, FOR EACH MERCHANT CHAR- ACTERISTICS VECTOR, A RESPECTIVE COMPRESSED MERCHANT VECTOR BY COMPRESSING THE MERCHANT CHARACTERISTICS VECTOR 406.

In one embodiment, at GENERATE COMPRESSED MERCHANT VECTOR DATA INCLUDING, FOR EACH MERCHANT CHARACTERISTICS VECTOR, A RESPECTIVE COMPRESSED MERCHANT VECTOR BY COMPRESSING THE MERCHANT CHARACTERISTICS VECTOR 406, compressed merchant vector data is generated including, for each merchant characteristics vector, a respective compressed merchant vector by compressing the merchant characteristics vector, using any of the methods, processes, and procedures discussed above with respect to FIGS. 1-2.

In one embodiment, once compressed merchant vector data is generated including, for each merchant characteristics vector, a respective compressed merchant vector by compressing the merchant characteristics vector at GENERATE COMPRESSED MERCHANT VECTOR DATA INCLUDING, FOR EACH MERCHANT CHARACTERISTICS VECTOR, A RESPECTIVE COMPRESSED MERCHANT VECTOR BY COMPRESSING THE MERCHANT CHARACTERISTICS VECTOR 406, process flow proceeds to GENERATE COMPRESSED ACCOUNT VECTOR DATA INCLUDING, FOR EACH ACCOUNT OF USERS OF THE ELECTRONIC BOOKKEEPING SYSTEM, A RESPECTIVE COMPRESSED ACCOUNT VECTOR 408.

In one embodiment, at GENERATE COMPRESSED ACCOUNT VECTOR DATA INCLUDING, FOR EACH ACCOUNT OF USERS OF THE ELECTRONIC BOOKKEEPING SYSTEM, A RESPECTIVE COMPRESSED ACCOUNT VECTOR 408, compressed account vector data is generated including, for each account of users of the data management system, a respective compressed account vector, using any of the methods, processes, and procedures discussed above with respect to FIGS. 1-2.

In one embodiment, once compressed account vector data is generated including, for each account of users of the data management system, a respective compressed account vector at GENERATE COMPRESSED ACCOUNT VECTOR DATA INCLUDING, FOR EACH ACCOUNT OF USERS OF THE ELECTRONIC BOOKKEEPING SYSTEM, A RESPECTIVE COMPRESSED ACCOUNT VECTOR 408, process flow proceeds to ASSIST USERS OF THE ELECTRONIC BOOKKEEPING SYSTEM TO SORT FINANCIAL TRANSACTIONS INTO THE ACCOUNTS BY ANALYZING THE COMPRESSED MERCHANT VECTOR DATA AND THE COMPRESSED ACCOUNT VECTOR DATA 410.

In one embodiment, at ASSIST USERS OF THE ELECTRONIC BOOKKEEPING SYSTEM TO SORT FINANCIAL TRANSACTIONS INTO THE ACCOUNTS BY ANALYZING THE COMPRESSED MERCHANT VECTOR DATA AND THE COMPRESSED ACCOUNT VECTOR DATA 410, users of the electronic bookkeeping system are assisted to sort financial transactions into the accounts by analyzing the compressed merchant vector data and the compressed account vector data, using any of the methods, processes, and procedures discussed above with respect to FIGS. 1-2.

In one embodiment, once users of the electronic bookkeeping system are assisted to sort financial transactions into the accounts by analyzing the compressed merchant vector data and the compressed account vector data at ASSIST USERS OF THE ELECTRONIC BOOKKEEPING SYSTEM TO SORT FINANCIAL TRANSACTIONS INTO THE ACCOUNTS BY ANALYZING THE COMPRESSED MERCHANT VECTOR DATA AND THE COMPRESSED ACCOUNT VECTOR DATA 410, process flow proceeds END 412.

In one embodiment, at END 412 the process for accurately and efficiently assisting users of a data management system to sort financial transactions into accounts is exited to await new data and/or instructions.

As noted above, the specific illustrative examples discussed above are but illustrative examples of implementations of embodiments of the method or process for accurately and efficiently assisting users of a data management system to sort financial transactions into accounts. Those of skill in the art will readily recognize that other implementations and embodiments are possible. Therefore, the discussion above should not be construed as a limitation on the claims provided below.

In one embodiment, a computing system implemented method accurately and efficiently assists users of a data management system to sort financial transactions into accounts. The method includes storing user data management data identifying accounts of a plurality of users of a data management system, the user data management data identifying how financial transactions of the users have been sorted into the accounts. The method includes storing account characteristics vector data including, for each account of the users of the data management system, a respective account characteristics vector indicating, for each of a plurality of merchants, if transactions involving the merchant have been sorted into the account. The method includes storing merchant characteristics vector data including, for each of the plurality of merchants, a respective merchant characteristics vector indicating if transactions involving the merchant have been sorted into a same account as each of the other merchants. The method includes generating compressed account vector data including, for each account characteristics vector, a respective compressed account vector by compressing the account characteristics vector into a reduced number of dimensions and generating compressed merchant vector data including, for each merchant characteristics vector, a respective compressed merchant vector by compressing the merchant characteristics vector into the reduced number of dimensions. The method includes receiving new financial transaction data related to a new financial transaction of one of the users and generating vector proximity data indicating a proximity of the compressed merchant vector associated with the new financial transaction to the compressed account vectors representing the accounts of the user. The method includes assisting the user to sort the new financial transaction into one of the accounts of the user based on the vector proximity data.

In one embodiment, a system for accurately and efficiently assisting users of a data management system to sort financial transactions into accounts, the system includes at least one processor at least one memory coupled to the at least one processor. The at least one memory has stored therein instructions which, when executed by any set of the one or more processors, perform a process. The process includes storing user data management data identifying accounts of a plurality of users of a data management system, the user data management data identifying how financial transactions of the users have been sorted into the accounts. The process includes storing account characteristics vector data including, for each account of the users of the data management system, a respective account characteristics vector indicating, for each of a plurality of merchants, if transactions involving the merchant have been sorted into the account. The process includes storing merchant characteristics vector data including, for each of the plurality of merchants, a respective merchant characteristics vector indicating if transactions involving the merchant have been sorted into a same account as each of the other merchants. The process includes generating compressed account vector data including, for each account characteristics vector, a respective compressed account vector by compressing the account characteristics vector into a reduced number of dimensions and generating compressed merchant vector data including, for each merchant characteristics vector, a respective compressed merchant vector by compressing the merchant characteristics vector into the reduced number of dimensions. The process includes receiving new financial transaction data related to a new financial transaction of one of the users and generating vector proximity data indicating a proximity of the compressed merchant vector associated with the new financial transaction to the compressed account vectors representing the accounts of the user. The process includes assisting the user to sort the new financial transaction into one of the accounts of the user based on the vector proximity data.

In one embodiment, a computing system implemented method accurately and efficiently assists users of a data management system to sort financial transactions into accounts. The method includes generating account characteristics vector data including, for each account of users of an electronic bookkeeping system, a respective account characteristics vector and generating merchant characteristics vector data including, for each of a plurality of merchants known to the electronic bookkeeping system, a respective merchant characteristics vector. The method includes generating compressed account vector data including, for each account characteristics vector, a respective compressed account vector by compressing the account characteristics vector and generating compressed merchant vector data including, for each merchant characteristics vector, a respective compressed merchant vector by compressing the merchant characteristics vector. The method includes assisting users of the electronic bookkeeping system to sort financial transactions into the accounts by analyzing the compressed merchant vector data and the compressed account vector data.

In one embodiment, a system for accurately and efficiently assisting users of a data management system to sort financial transactions into accounts, the system includes at least one processor at least one memory coupled to the at least one processor. The at least one memory has stored therein instructions which, when executed by any set of the one or more processors, perform a process. The process includes generating account characteristics vector data including, for each account of users of an electronic bookkeeping system, a respective account characteristics vector and generating merchant characteristics vector data including, for each of a plurality of merchants known to the electronic bookkeeping system, a respective merchant characteristics vector. The process includes generating compressed account vector data including, for each account characteristics vector, a respective compressed account vector by compressing the account characteristics vector and generating compressed merchant vector data including, for each merchant characteristics vector, a respective compressed merchant vector by compressing the merchant characteristics vector. The process includes assisting users of the electronic bookkeeping system to sort financial transactions into the accounts by analyzing the compressed merchant vector data and the compressed account vector data.

In one embodiment, a computing system implemented method accurately and efficiently assists users of a data management system to sort financial transactions into accounts. The method includes storing user data management data identifying accounts of a plurality of users of a data management system. The user data management data identifies how financial transactions of the users have been sorted into the accounts. The method includes storing merchant characteristics vector data including, for each of the plurality of merchants, a respective merchant characteristics vector indicating if transactions involving the merchant have been sorted into a same account as each of the other merchants. The method includes generating compressed merchant vector data including, for each merchant characteristics vector, a respective compressed merchant vector by compressing the merchant characteristics vector into a reduced number of dimensions and generating compressed account vector data including, for each account of the users, a respective compressed account vector having the reduced number of dimensions. The method includes receiving new financial transaction data related to a new financial transaction of one of the users, generating vector proximity data indicating a proximity of the compressed merchant vector associated with the new financial transaction to the compressed account vectors representing the accounts of the user, and assisting the user to sort the new financial transaction into one of the accounts of the user based on the vector proximity data.

In one embodiment, a system for accurately and efficiently assisting users of a data management system to sort financial transactions into accounts, the system includes at least one processor at least one memory coupled to the at least one processor. The at least one memory has stored therein instructions which, when executed by any set of the one or more processors, perform a process. The process includes storing user data management data identifying accounts of a plurality of users of a data management system. The user data management data identifies how financial transactions of the users have been sorted into the accounts. The process includes storing merchant characteristics vector data including, for each of the plurality of merchants, a respective merchant characteristics vector indicating if transactions involving the merchant have been sorted into a same account as each of the other merchants. The process includes generating compressed merchant vector data including, for each merchant characteristics vector, a respective compressed merchant vector by compressing the merchant characteristics vector into a reduced number of dimensions and generating compressed account vector data including, for each account of the users, a respective compressed account vector having the reduced number of dimensions. The process includes receiving new financial transaction data related to a new financial transaction of one of the users, generating vector proximity data indicating a proximity of the compressed merchant vector associated with the new financial transaction to the compressed account vectors representing the accounts of the user, and assisting the user to sort the new financial transaction into one of the accounts of the user based on the vector proximity data.

In one embodiment, a computing system implemented method accurately and efficiently assists users of a data management system to sort financial transactions into accounts. The method includes generating merchant characteristics vector data including, for each of a plurality of merchants known to an electronic bookkeeping system, a respective merchant characteristics vector and generating compressed merchant vector data including, for each merchant characteristics vector, a respective compressed merchant vector by compressing the merchant characteristics vector. The method includes generating compressed account vector data including, for each account of users of an electronic bookkeeping system, a respective compressed account vector and assisting users of the electronic bookkeeping system to sort financial transactions into the accounts by analyzing the compressed merchant vector data and the compressed account vector data.

In one embodiment, a system for accurately and efficiently assisting users of a data management system to sort financial transactions into accounts, the system includes at least one processor at least one memory coupled to the at least one processor. The at least one memory has stored therein instructions which, when executed by any set of the one or more processors, perform a process. The process includes generating merchant characteristics vector data including, for each of a plurality of merchants known to an electronic bookkeeping system, a respective merchant characteristics vector and generating compressed merchant vector data including, for each merchant characteristics vector, a respective compressed merchant vector by compressing the merchant characteristics vector. The process includes generating compressed account vector data including, for each account of users of an electronic bookkeeping system, a respective compressed account vector and assisting users of the electronic bookkeeping system to sort financial transactions into the accounts by analyzing the compressed merchant vector data and the compressed account vector data. In one embodiment, a computing system implemented method accurately and efficiently assists users of a data management system to sort financial transactions into accounts. The method includes generating merchant characteristics vector data including, for each of a plurality of merchants known to an electronic bookkeeping system, a respective merchant characteristics vector and generating compressed merchant vector data including, for each merchant characteristics vector, a respective compressed merchant vector by compressing the merchant characteristics vector. The method includes generating compressed account vector data including, for each account of a selected user of the electronic bookkeeping system, a respective compressed account vector having a same number of dimensions as the compressed merchant characteristics vectors. The method includes assisting the selected user of the electronic bookkeeping system to sort financial transactions into an account of the selected user by analyzing the compressed merchant vector data and the compressed account vector data.

In one embodiment, a system for accurately and efficiently assisting users of a data management system to sort financial transactions into accounts, the system includes at least one processor at least one memory coupled to the at least one processor. The at least one memory has stored therein instructions which, when executed by any set of the one or more processors, perform a process. The process includes generating merchant characteristics vector data including, for each of a plurality of merchants known to an electronic bookkeeping system, a respective merchant characteristics vector and generating compressed merchant vector data including, for each merchant characteristics vector, a respective compressed merchant vector by compressing the merchant characteristics vector. The process includes generating compressed account vector data including, for each account of a selected user of the electronic bookkeeping system, a respective compressed account vector having a same number of dimensions as the compressed merchant characteristics vectors. The process includes assisting the selected user of the electronic bookkeeping system to sort financial transactions into an account of the selected user by analyzing the compressed merchant vector data and the compressed account vector data.

The disclosed embodiments provide one or more technical solutions to the technical problem of providing data management systems dynamically assist users to sort their financial transactions into the correct accounts. These and other embodiments of the data management system are discussed in further detail below.

Assisting users to sort financial transactions into user accounts based on transaction grouping data, account grouping data, and user grouping data does not constitute an abstract idea, but rather represents a technical solution to a technical problem of data management systems that are unable to effectively assist users in categorizing financial transactions. First, assisting users to sort financial transactions into user accounts based on transaction grouping data, account grouping data, and user grouping data is not an abstract idea because it is not merely an idea itself (e.g., can be performed mentally or using pen and paper). Second, assisting users to sort financial transactions into user accounts based on transaction grouping data, account grouping data, and user grouping data is not an abstract idea because it is not a fundamental economic practice (e.g., is not merely creating a contractual relationship, hedging, mitigating a settlement risk, etc.). Third, assisting users to sort financial transactions into user accounts based on transaction grouping data, account grouping data, and user grouping data is not an abstract idea because it is not a method of organizing human activity (e.g., managing a game of bingo). Fourth, although mathematics may be used to generate an analytics model, the disclosed and claimed methods and systems of assisting users to sort financial transactions into user accounts based on transaction grouping data, account grouping data, and user grouping data are not an abstract idea because the methods and systems are not simply a mathematical relationship/formula.

Assisting users to sort financial transactions into user accounts based on transaction grouping data, account grouping data, and user grouping data is not an abstract idea because having an accounting system understand the actual usage patterns of each user's account yields significant improvement to the technical fields of user experience, customer service, customer retention, and electronic data management, according to one embodiment. The present disclosure adds significantly to the field of electronic data management because the disclosed data management system increases the knowledge of the needs and purposes of users of the data management system, increases the ability of the data management system to provide automated assistance in sorting, grouping and categorizing financial transactions, increases the likelihood of improving/maintaining a user's trust in the data management system; and reduces the amount of time users spend managing their finances, according to one embodiment.

As a result, embodiments of the present disclosure allow for reduced use of processor cycles, memory, and power consumption, by reducing the time spent by users sorting financial transactions. Consequently, computing and communication systems implementing or providing the embodiments of the present disclosure are transformed into more operationally efficient devices and systems.

In addition to improving overall computing performance, assisting users to sort financial transactions into user accounts based on transaction grouping data, account grouping data, and user grouping data significantly improves the field of data management systems by reducing the amount of time it takes for a user to sort financial transactions, according to one embodiment. Therefore, both human and non-human resources are utilized more efficiently. Furthermore, by assisting users to sort financial transactions into user accounts based on transaction grouping data, account grouping data, and user grouping data, loyalty in the data management system is increased. This results in repeat customers, efficient data management services, and reduced abandonment of use of the data management system, according to one embodiment.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

As used herein, the term "account" includes, but is not limited to, a grouping of transactions within an accounting system. For instance, in various embodiments, accounts can be hierarchical in that one account can contain the content of one or more other accounts. Apart for hierarchical nesting accounts may also be structured to be either mutually exclusive or not mutually exclusive such that if there is a containment relationship between two accounts the containment may either be complete or partial.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
    identifying accounts of a plurality of users of a data management system, wherein the data management system is associated with a plurality of merchants;
    identifying how financial transactions of the users have been sorted into the accounts;
    storing, for each merchant of the plurality of merchants, a respective merchant characteristics vector including a plurality of data values, wherein each data value of the plurality of data values corresponds to a respective merchant of the plurality of merchants and indicates how often financial transactions involving the respective merchant and the merchant associated with the respective merchant characteristics vector have been sorted into a same account of the accounts;
    generating, for each stored merchant characteristics vector, a respective compressed merchant vector by compressing the merchant characteristics vector into a reduced number of dimensions using one or more Word2Vec neural network models trained with negative sampling;

generating, for each identified account of the users, a respective compressed account vector having the reduced number of dimensions;

receiving a new financial transaction of one of the users;

generating a proximity of the compressed merchant vector associated with the new financial transaction to the generated compressed account vectors representing the accounts of the user, wherein generating the proximity includes identifying respective angles between the compressed merchant vector associated with the new financial transaction and each of the compressed account vectors representing the accounts of the user; and assisting the user to sort the new financial transaction into one of the accounts of the user based on the proximity.

2. The method of claim 1, further comprising, responsive to receiving the new financial transaction:

identifying a merchant of the plurality of merchants involved in the new financial transaction;

retrieving the compressed merchant vector associated with the identified merchant; and retrieving the compressed account vectors associated with the accounts of the user.

3. The method of claim 1, further comprising generating the compressed account vector based on the compressed merchant vector.

4. The method of claim 3, further comprising generating each compressed account vector by summing the compressed merchant vectors associated with the account.

5. The method of claim 1, wherein the proximity identifies one or more candidate accounts that are most likely to fit the new financial transaction.

6. The method of claim 5, wherein assisting the user to sort the new financial transaction includes:

generating a message identifying the one or more candidate accounts; and outputting the message to the user.

7. The method of claim 6, wherein the message prompts the user to sort the new financial transaction into one of the one or more candidate accounts.

8. The method of claim 6, wherein the message prompts the user to approve or confirm sorting of the new financial transaction into one of the one or more candidate accounts.

9. The method of claim 6, wherein the message displays most prominently a candidate account that has the highest probability of being a correct account for the new financial transaction based on the proximity.

10. The method of claim 5, further comprising automatically sorting the new financial transaction into one of the candidate accounts if the candidate account has a probability greater than a threshold probability of being a correct account for the new financial transaction based on the proximity.

11. The method of claim 1, wherein the accounts correspond to bookkeeping categories.

12. The method of claim 1, wherein the data management system is an electronic bookkeeping system.

* * * * *